(12) United States Patent
Barlog

(10) Patent No.: US 8,449,199 B2
(45) Date of Patent: May 28, 2013

(54) BEARING RETENTION ASSEMBLY FOR AND METHOD OF ASSEMBLING TURBOCHARGERS

(75) Inventor: Daniel J. Barlog, DeMotte, IN (US)

(73) Assignee: Precision Turbo & Engine Rebuilders, Inc., Hebron, IN (US)

( * ) Notice: Subject to any disclaimer, the term of this patent is extended or adjusted under 35 U.S.C. 154(b) by 365 days.

(21) Appl. No.: 12/912,854

(22) Filed: Oct. 27, 2010

(65) Prior Publication Data

US 2012/0107112 A1 May 3, 2012

(51) Int. Cl.
*F16C 19/08* (2006.01)
*F16C 23/06* (2006.01)

(52) U.S. Cl.
USPC ............. 384/512; 384/99; 384/291; 384/322; 384/462; 384/906; 417/407; 415/112

(58) Field of Classification Search
USPC .................. 384/99, 286, 322, 369, 489–490, 384/504, 512, 5, 906, 291, 462; 417/406–407; 415/111–112
See application file for complete search history.

(56) References Cited

U.S. PATENT DOCUMENTS

| | | | | |
|---|---|---|---|---|
| 2,441,294 A | * | 5/1948 | Shafer | 384/906 |
| 3,304,802 A | * | 2/1967 | Kofink | 464/180 |
| 3,811,741 A | * | 5/1974 | McInerney et al. | 384/291 |
| 4,240,678 A | * | 12/1980 | Sarle et al. | 384/369 |
| 4,721,441 A | | 1/1988 | Miyashita et al. | |
| 4,798,523 A | | 1/1989 | Glaser et al. | |
| 5,076,766 A | * | 12/1991 | Gutknecht | 417/407 |
| 5,145,334 A | * | 9/1992 | Gutknecht | 417/407 |
| 5,890,881 A | * | 4/1999 | Adeff | 417/407 |
| 5,967,762 A | | 10/1999 | Keller et al. | |
| 6,220,829 B1 | * | 4/2001 | Thompson et al. | 417/407 |
| 6,877,901 B2 | | 4/2005 | Wollenweber | |
| 7,214,037 B2 | | 5/2007 | Mavrosakis | |
| 7,461,979 B2 | | 12/2008 | Mavrosakis | |
| 7,670,056 B2 | * | 3/2010 | Petitjean et al. | 384/322 |
| 2007/0003175 A1 | * | 1/2007 | Petitjean et al. | 384/322 |
| 2007/0183704 A1 | * | 8/2007 | Umekawa | 384/517 |
| 2009/0110572 A1 | * | 4/2009 | Meacham et al. | 417/406 |
| 2009/0136334 A1 | * | 5/2009 | Cornelio | 415/1 |
| 2009/0293257 A1 | * | 12/2009 | Castan et al. | 415/182.1 |
| 2010/0068053 A1 | * | 3/2010 | Mathieu | 415/229 |

FOREIGN PATENT DOCUMENTS

| | | | |
|---|---|---|---|
| DE | 1526439 | * | 2/1970 |
| EP | 2065564 A2 | * | 6/2009 |
| EP | 2131053 A1 | * | 12/2009 |
| JP | 2007023858 A | * | 2/2007 |

\* cited by examiner

*Primary Examiner* — Marcus Charles
(74) *Attorney, Agent, or Firm* — Ice Miller LLP

(57) ABSTRACT

An assembly for a turbocharger and a method of assembling a turbocharger are disclosed. Such an assembly can include an elongate pin having a tapered part and a protrusion at one end of the pin. The elongate pin is configured to be inserted within a housing opening and a cartridge opening such that the taper of the body portion of the pin mates with the taper of the housing opening. The cartridge opening is configured as to mate with the pin such that the pin substantially restricts the bearing cartridge from surging and rolling but substantially permits all other movements of the bearing cartridge.

18 Claims, 8 Drawing Sheets

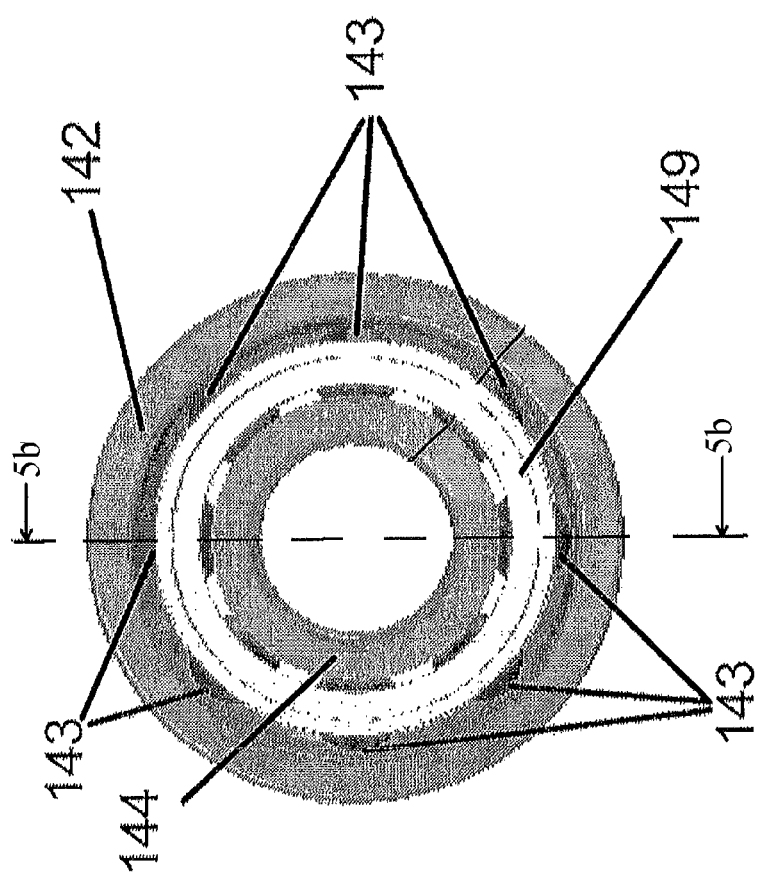

BEARING RETENTION ASSEMBLY FOR AND METHOD OF ASSEMBLING TURBOCHARGERS

BACKGROUND

Turbochargers are used with engines to improve the engine's volumetric efficiency. Turbochargers, as well as other types of turbomachinery, include high speed rotating components, which generally require damping provisions. In performance turbocharger applications, where rotor shaft speeds are high and external influences on shaft motion are also high, the ability to effectively dampen the rotor shaft has a close relationship to the performance of the engine as a whole. Rotor bearing devices of the turbomachinery are typically located adjacent to the rotor shaft to dampen the rotor shaft relative to the turbomachinery housing.

Up until now, the systems used to locate the rotor bearing device of the turbomachinery relative to the turbomachinery's housing to assist in damping the shaft have failed to precisely locate the bearing device. In particular, the current systems fail to substantially limit the bearing device from surging and rolling while allowing for the required, remaining freedoms of motion, namely heaving, swaying, pitching, and yawing. For example, in one prior art system, a cylindrical, knurled pin is positioned within a clearance fit hole in a bearing device to locate the bearing relative to the housing. Unfortunately, the knurled pin must be loosely fitted within the bearing device to allow for the required freedoms of motion for the bearing device. Because of the loose fit of the knurled pin within the bearing device, the prior art system has failed to precisely locate the bearing device so as to substantially limit the bearing device from surging and rolling. The loose fit of the knurled pin also results in diminished performance and causes the shaft and bearing device to wear quickly.

Accordingly, there exists a need for an assembly that can precisely locate the rotor bearing system so as to substantially limit the bearing system from surging and rolling while allowing for a film of oil or the like to dampen the required four remaining freedoms of motion of the rotor bearing system. The assembly should also afford the benefits of increased performance of the turbocharger and a longer life span for the turbocharger.

SUMMARY

The present disclosure discloses an assembly for a turbocharger and a method of assembling a turbocharger. Such an assembly for a turbocharger includes an elongate pin having a first end, a second end, and a body portion between the first end and the second end. At least a first part of the body portion comprises a taper and optionally, a second part of the body portion adjacent the second end comprises a first protruding feature. The assembly also includes a housing comprising a substantially cylindrical bore having a longitudinal axis, a first bore end, a second bore end, and a housing opening. The housing opening is configured to receive at least a portion of the elongate pin and optionally, at least a part of the housing opening comprising a taper. The assembly can further include a bearing cartridge comprising an outer race, an inner race, and a cartridge opening. The bearing cartridge is positioned within said housing substantially centered on the longitudinal axis between the first bore end and the second bore end such that the cartridge opening is substantially aligned with the housing opening. The elongate pin is configured to be inserted within the housing opening and the cartridge opening such that the taper of the body portion of the pin mates with the taper of the housing opening. The cartridge opening is configured to mate with the first protruding feature of the pin such that the pin substantially restricts the bearing cartridge from surging and rolling but substantially permits all other movements of the bearing cartridge.

A method of assembling such a turbocharger includes providing the elongate pin described above, the housing described above, and the bearing cartridge described above. The method includes the step of placing the bearing cartridge within the housing in such a manner that it is substantially centered on the longitudinal axis between the first bore end and the second bore end; such that the cartridge opening is substantially aligned with the housing opening. The method further includes the step of inserting the elongate pin into the housing opening and the cartridge opening; such that the first protruding feature fits within the cartridge opening. In this manner, the elongate pin substantially restricts the bearing cartridge from surging and rolling but substantially permits all other movements of the bearing cartridge.

BRIEF DESCRIPTION OF THE DRAWINGS

The features and advantages of this disclosure, and the manner of attaining them, will be more apparent and better understood by reference to the accompanying drawings, wherein:

FIG. 5a shows the bearing cartridge of the turbocharger assembly of FIG. 1 facing down the longitudinal direction.

DETAILED DESCRIPTION

Figure 1:
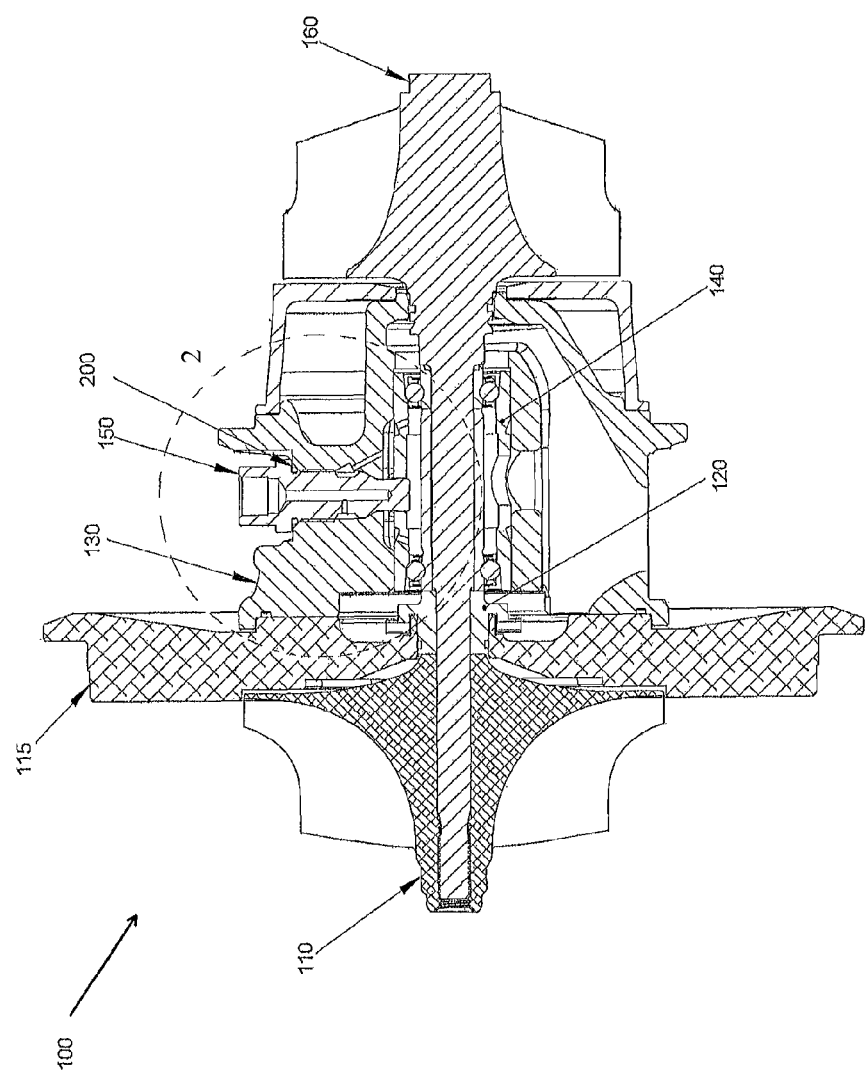
FIG. 1 shows a cross-sectional view of an exemplary turbocharger assembly.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a cross-sectional view of an exemplary embodiment of a turbocharger assembly 100 according to the present disclosure. The turbocharger assembly 100 in FIG. 1 includes a compressor wheel 110, a backing plate 115, a seal collar 120, a housing 130, a bearing cartridge 140, a pin 150, and a turbine shaft 160. The turbine shaft 160 is supported by and rotates within the bearing cartridge 140. In particular, the bearing cartridge 140 (in coordination with other parts of the assembly 100) substantially maintains the shaft 160 within desired spatial parameters despite the movement and rotation of the shaft 160. As discussed further below, the ability of the bearing cartridge 140 (in coordination with the rest of the assembly 100) to control the movement of the shaft 160 is directly related to properly maintaining the alignment of the shaft 160 and reducing the rate at which the shaft 160 and other parts of the turbocharger assembly 100 wear out.

Figure 2:
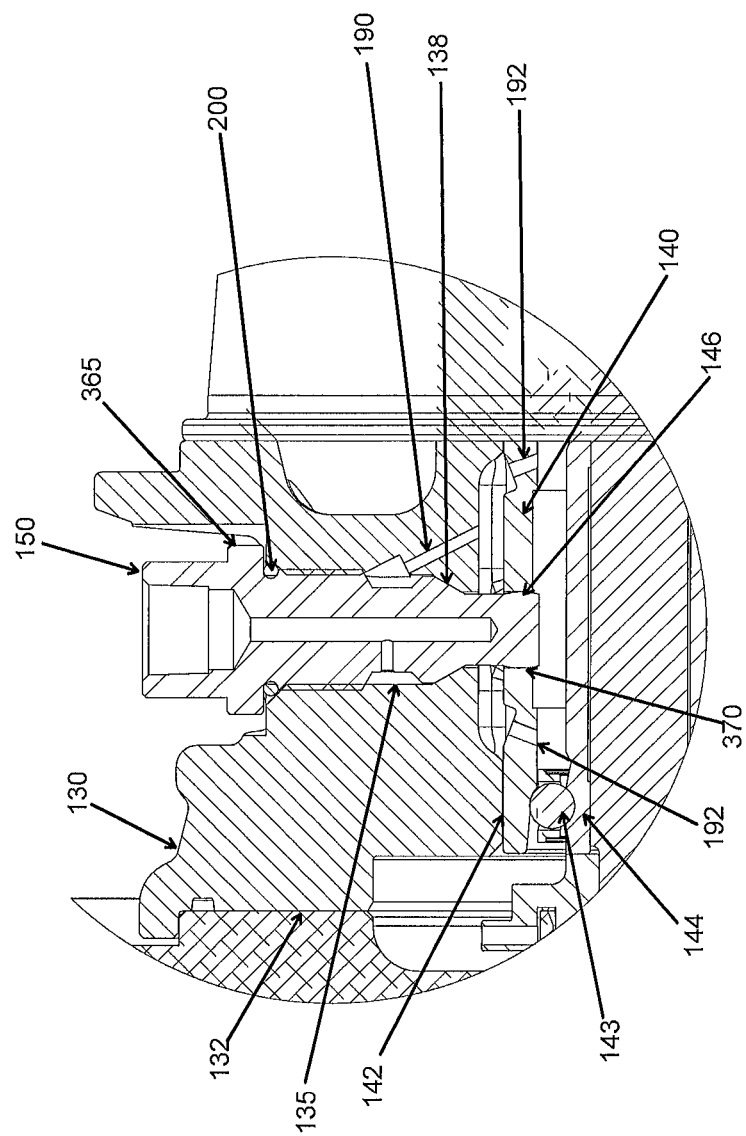
FIG. 2 shows a magnified view of detail 2 in FIG. 1.

As shown in FIG. 1, the bearing cartridge 140 resides within the housing 130. The fit between the bearing cartridge 140 and the housing 130 may be such that a fluid (e.g. a film of pressurized oil) can be disposed between the bearing cartridge 140 and housing 130. At least partially because of the fluid, the bearing cartridge 140 is effectively cushioned and substantially spaced from the housing 130. The fluid that surrounds the bearing cartridge 140 provides viscous damping for the turbine shaft 160 because the shaft 160 interacts with the bearing cartridge 140, which in turn compresses the fluid, during operation. The viscous damping is beneficial to the durability of the turbine shaft 160 and bearing cartridge 140, particularly because the turbine shaft 160 may whirl, gyrate, oscillate, and the like during operation. It should be noted that, typically, the fluid may be in continuous supply to the space between the bearing cartridge 140 and housing 130 during operation through various conduits and passages. As shown in FIG. 2, for example, conduit 190 is shown connecting the housing opening 135 and the space between the housing 130 and bearing cartridge 140. It should also be noted that the fluid discussed herein may include any type of fluid, including a pressurized oil.

FIG. 2 shows a magnified view of section D of FIG. 1. In particular, FIG. 2 shows pin 150 partially within housing 130 and partially within the bearing cartridge 140. The pin 150 precisely locates and retains the bearing cartridge 140 with respect to the housing 130 such that the bearing cartridge 140 is restricted from surging and rolling but substantially permits all other movements of the bearing cartridge 140. As the bearing cartridge 140 surges and rolls through its interaction with the shaft 160, the bearing cartridge 140 applies forces on the pin 150. Because the pin 150 is inserted within the housing 130, the forces applied to the pin 150 from the bearing cartridge 140 are absorbed and resisted by the interaction between the pin 150 and the housing 130. As noted above, the movement of the shaft 160 (shown in FIG. 1) is dampened in the other freedoms of motion by the interaction between the bearing cartridge 140 and the fluid in the space between the cartridge 140 and housing 130. Based upon this damping, the shaft 160 may remain aligned to perform at a greater rate and have a longer life-span.

Figure 3A:
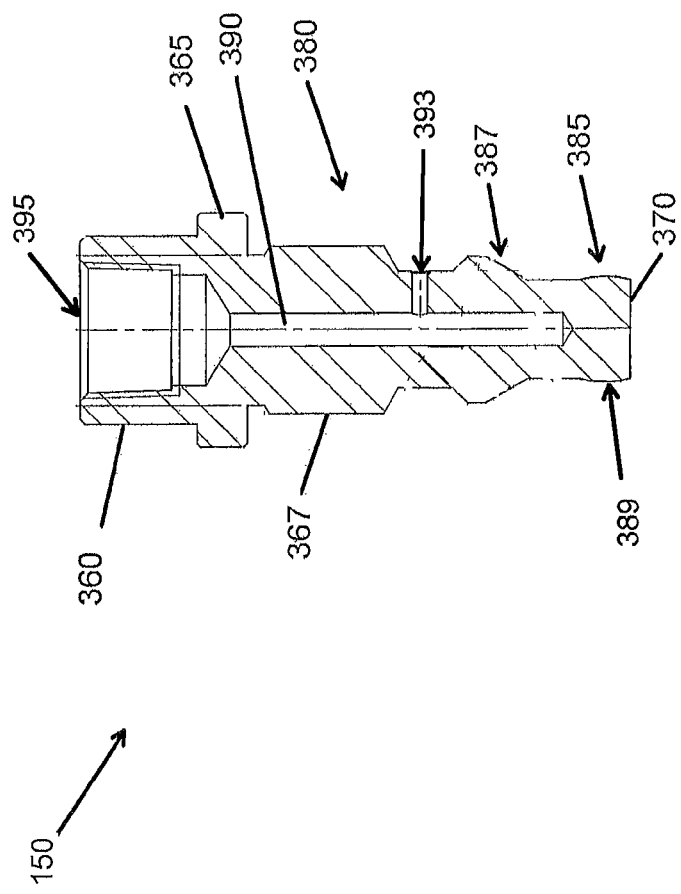
FIG. 3a shows a cross-sectional view of a pin that can be used with the turbocharger assembly of FIG. 1.

FIG. 3a shows a cross-sectional view of pin 150 of FIG. 1. As exemplified in FIG. 3a, a pin 150 may typically be elongate and substantially cylindrical with a first end 360, second end 370, and body portion 380 between the first end 360 and second end 370. It should be noted that the shape of the cross-section is typically continuous around the elongate axis of the pin 150 but may vary. The pin 150 may have various lengths, diameters, and shapes that are appropriate for the turbocharger assembly in which it is used. In this example, the pin 150 may be about 1.56 inches long with about a 0.175 inch radius but may be other dimensions. For example, the pin 150 may be about 1.638 inches long with about a 0.175 inch radius. As shown in FIG. 3a, the pin 150 may be substantially cylindrical but also include various shapes and features. It should also be noted that the pin 150 may be formed of various materials, including, but not limited to, steel, such as medium carbon steel, aluminum, and the like. As shown in FIG. 3a, the body portion 380 of a pin 150 may include a middle portion 367. The middle portion 367 may have a diameter that is, for example, substantially the same as the housing opening 135 but slightly larger than the rest of the body portion 380 in order to provide a secure fit between the pin 150 and housing 130 (as shown in FIGS. 1 and 2). While various diameters may be used for middle portion 367, the diameter of the middle portion 367 is about 0.475 inches in this example. It should be noted that the pin 150 may include multiple middle portions 367 along the length of the body portion 380 and is not limited to merely one as shown in FIG. 3a.

In FIG. 3a, the body portion 380 of the pin 150 adjacent the second end 370 includes a first protruding feature 385. As will be discussed further below, the first protruding feature 385 is configured to interact with the bearing cartridge 140 (shown in FIG. 1) in a tight manner such that the bearing cartridge 140 has the freedom to heave, sway, pitch, and yaw with respect to the housing 130 while not allowing the bearing cartridge 140 to surge or roll. The cross-section of the first protruding feature 385 may include a curved surface 389 that protrudes out with respect to the adjacent body portion 380. In this manner, the cross-section of the first protruding feature 385 of the pin 150 is substantially egg-shaped (with one end substantially flat and the other end matching the width of the adjacent portion of the pin 150), as opposed to the adjacent body portion 380 of the pin 150 which is substantially rectangular in cross-section. Of course, the cross-section of the first protruding feature 385 of the pin 150 may be various other shapes, such as, for example, a wavy surface having multiple peaks and valleys, a substantially spherical shape, and the like. The first protruding feature 385 may be protrude across various lengths of the pin 150, such as, for example, 0.225 inches. The cross-section of the first protruding feature 385 may include a shape with a peak diameter of about 0.316 inches and a minimum diameter of about 0.295 inches. Of course, the first protruding feature 385 may be other dimensions and/or shapes as well.

As shown in FIG. 3a, the pin 150 may include a head 365 that is positioned on the body portion 380 of the pin 150. It should be noted that the head 365 may alternatively be positioned at the first end 360 of the pin 150. A head 365 is generally a structure of the pin 150 that acts to stop the pin 150 from further insertion as the pin 150 is being inserted into a hole with a diameter that is less than the diameter of the cross-section of the head 365. The head 365 may have various cross-section shapes. As shown in FIG. 3a, the head may include a rectangular cross-section. Typically, the head 365 is positioned a distance from the protruding feature 385 such that when the pin 150 is inserted into the housing 130 and bearing cartridge 140, the head 365 restricts the further insertion of the pin 150 and the first protruding feature 385 is in mating position with the bearing cartridge 140 (shown in FIG. 2). While the head 365 may be at any position that prevents the pin 150 from being over-inserted and to allow the protruding feature 385 to be aligned with a cartridge opening 146, the head 365 in this example is located about 1.06 inches from the second end 370. Similarly, while the head 365 can have any diameter that is greater than the hole that the pin 150 is being inserted in, the head 365 in this example has a diameter of about 0.615 inches.

Referring to FIG. 2, the head 365 may have a diameter that is greater than the diameter of the housing opening 135 such that the pin 150 may be inserted (second end 370 inserted first) into the housing opening 135 until the head 365 contacts the housing 130. Also as shown in FIG. 2, the distance between the second end 370 and the head 365 may be such that when the pin 150 is inserted into the housing opening with the head 365 restricting further insertion, the first protruding feature 385 may be aligned with the cartridge opening 146 of the bearing cartridge 140.

As shown in FIG. 3a, the pin 150 may also include a tapered portion 387. While FIG. 3a shows pin 150 with a tapered portion 387, it should be noted that the tapered portion is not required and pins 150 without such a tapered portion can be used. The tapered portion 387 of pin 150 may be located between the first protruding feature 385 and the first end 360 but it may be located on other portions of the pin 150. The tapered portion 387 may be set at any angle from the longitudinal axis of the housing opening 135, such as sixty degrees, forty-five degrees, thirty degrees, and the like. The tapered portion 387 may also be continuous across two or more taper areas having different angles of taper, such as a first taper of sixty degrees followed by a second taper of forty-five degrees. It should also be noted that there may be more than one tapered portion on pin 150. As shown in FIG. 2, the tapered portion 387 of the pin 150 may be mated with the taper feature 138 of the housing 130 to maintain the pin 150 in substantially the same position relative to the housing 130. Because of this spatial stability, the pin 150 is able to locate the bearing cartridge 140 with greater accuracy. As noted above, this enhanced ability to locate the bearing cartridge 140 accurately improves the performance and life of the assembly 100.

Referring to FIGS. 2 and 3a, the tapered portion 387 of the pin 150 may also be mated with the taper feature 138 of the housing 130 to substantially form a seal between the pin 150 and housing 130. In one embodiment of the present disclosure, the opening 393 in the body portion 380 of the pin 150 may be positioned between the tapered portion 387 and the second end 370. With this configuration, the tapered portion 387 of the pin 150 and tapered feature 138 of the housing 130 form a seal such that a fluid (e.g., oil) that is contained, for example, in the space between the housing 130 and bearing cartridge 140 or in another area of the turbocharger assembly 100 is substantially restricted from leaking out of the assembly 100 from the housing opening 135 via the space between the pin 150 and housing 130.

As shown in FIG. 3a, the pin 150 may also include a hollow interior portion 390 with openings 393 and 350 in the first end 360 and body portion 380. Therefore, even when the pin 150 is engaged within a housing and bearing cartridge (for example, see FIG. 2), the interior portion 390 and openings in the pin 150 allow fluids, such as oil, to pass through opening 395, into the interior portion 390, and out of opening 393 of the pin 150. For example and referring to FIGS. 2 and 3a, a fluid may be fed to portions of the housing 130 and bearing cartridge 140, including the space between the housing 130 and bearing cartridge 140 by pouring fluid into opening 395. In this manner, the fluid will pass through the interior portion 390 of the pin 150 and out of opening 393 of the body portion 380 into the space between the housing 130 and bearing cartridge 140.

Figure 3B:
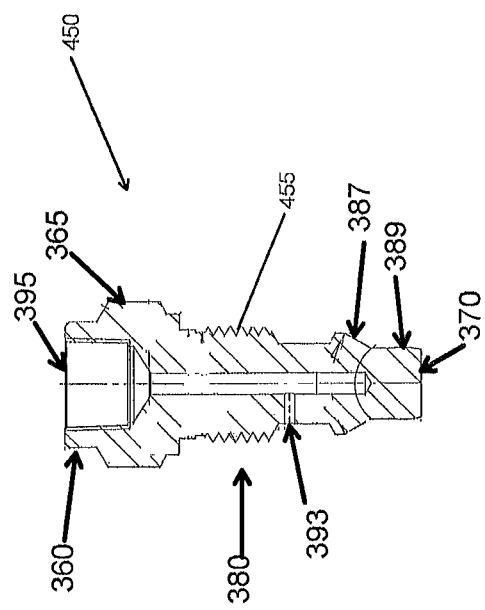
FIG. 3b shows a cross-sectional view of another pin that can be used with the turbocharger assembly of FIG. 1.

It should be noted that a variety of pins can be used in turbo assembly 100. For example, FIG. 3b shows another pin 450 that can be used. As shown in FIG. 3b, pin 450 has the same general construction as pin 150 except that pin 450 includes threads 455 on its body portion 380. Such threads may secure or otherwise mate the pin 450 to the housing 130. While threads 455 are shown between first end 360 and tapered portion 387, the threads 455 may be located anywhere on the pin 450, such as, for example, on the tapered portion 387 of the pin 150. When the pin 450 is equipped with such threads, the opening 135 of housing 130 can also be equipped with threads in a corresponding location so that the pin 450 can be secured into place by having the threads 455 of the pin 450 and the corresponding threads of the housing interact with one another.

Figure 4C:
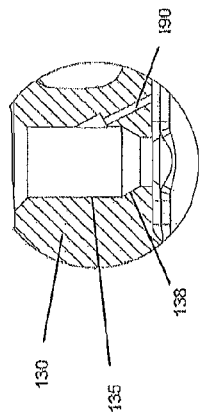
FIG. 4c shows detail 4c of the bearing housing of FIG. 4b.
Figure 4B:
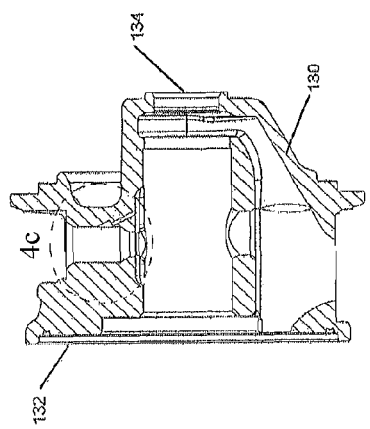
FIG. 4b shows the bearing housing of FIG. 4a along section 4b-4b.

As shown in FIGS. 2 and 4b, housing 130 includes a substantially cylindrical bore with a first bore end 132, a second bore end 134 (shown in FIG. 4b), and a housing opening 135. The housing opening 135 may be located about halfway between the first bore end 132 and the second bore end 134. The housing opening 135 may be located anywhere along the housing 130, including 1.27 inches from the first bore end 132 (to the longitudinal axis of the housing opening 135). The housing opening 135 is configured to receive at least a portion of the elongate pin 150. As shown in FIG. 2, the housing opening 135 may include a tapered portion 138. The tapered portion 138 of the housing opening 135 may be configured to mate with the tapered portion 387 of the pin 150 to form a seal, which can substantially restrict the flow of a lubricating fluid (e.g., oil) contained in the space between the housing 130 and bearing cartridge 140 from leaving the turbocharger assembly 100 through the housing opening 135. It should be noted that the housing 130 may not include a tapered portion 138, particularly when the corresponding pin 150 does not include a taper portion. As shown in FIG. 1, the tapered portion 138 of the housing 130 may be located near the bearing cartridge 140 (close to the second end 370) but it may be located at other locations of the housing 130. The tapered portion 138 may be set at any angle from the longitudinal axis of the housing opening 135, such as sixty degrees, forty-five degrees, thirty degrees, and the like. The tapered portion 138 may also be continuous across two or more taper areas having different angles of taper, such as a first taper of sixty degrees followed by a second taper of forty-five degrees. As shown in FIG. 1, housing 130 may also include one or more conduits 190 that connect the housing opening 135 to the space between the housing 130 and bearing cartridge 140.

Figure 4A:
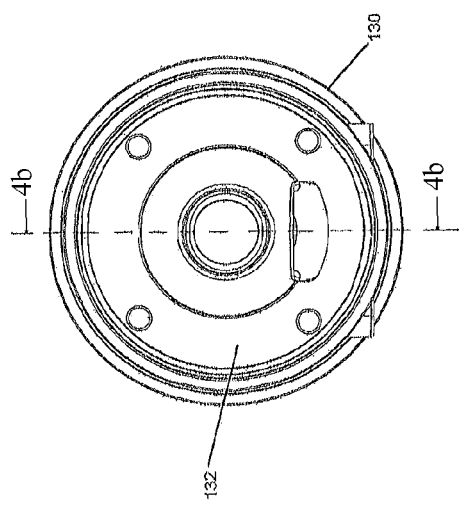
FIG. 4a shows the bearing housing of the turbocharger assembly of FIG. 1 facing the first bore end.

FIGS. 4a through 4c show the bearing housing 130 of the turbocharger assembly 100. In FIG. 4a, the first bore end 132 of the bearing housing 130 is shown. FIG. 4b shows the bearing housing 130 of FIG. 4a along section G-G. The bearing housing 130 may be various sizes and shapes. For example, housing 130 may have a circular cross-section that is about 4.5 inches in diameter and about 3.1 inches deep (from first bore end 132 to second bore end 134). FIG. 4c shows an expanded view of detail J from FIG. 4b. In particular, FIG. 4c shows the housing opening 135 of the bearing housing 130, as well as conduit 190 and housing tapered portion 138. The housing opening 135 may vary in diameter along the longitudinal axis of the housing opening 135. For example, the housing opening 135 may have a diameter of about 0.317 inches at one end below the tapered portion 138 and a diameter of about 0.453 inches above the tapered portion 138.

The housing 130 depicted in FIGS. 1, 2, and 4a-4c is just one example of the housing that can be used and various other dimensions may be used for the housing opening 135, tapered portion 138, and other portions of the housing 130. For example, the dimensions of the housing 130 may be designed based upon the desired performance of the system, size of other components (e.g., bearing cartridge 140), and the like. It should also be noted that the housing 130 may be formed of various materials, including, but not limited to, steel, aluminum, iron, and the like.

Figure 5B:
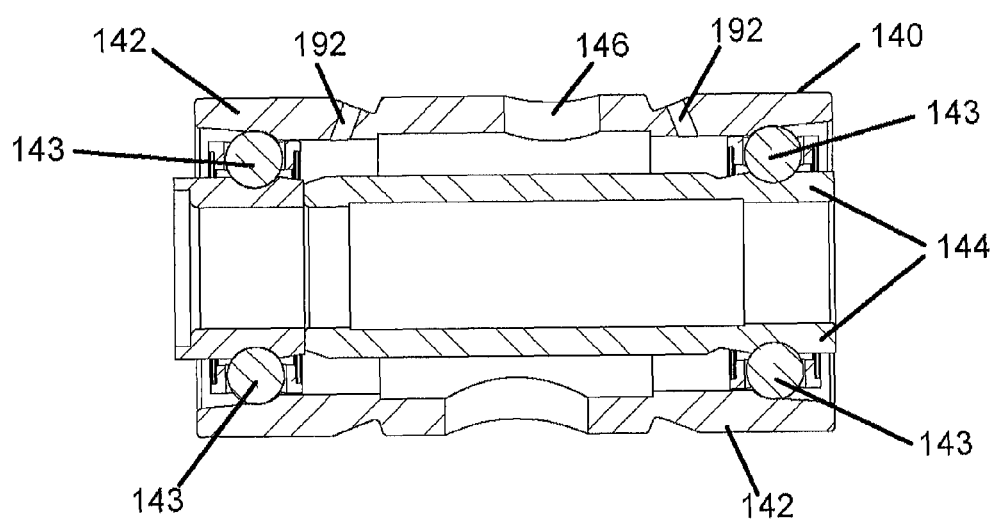
FIG. 5b shows the bearing cartridge of FIG. 5a along section 5b-5b.

FIG. 5a shows a view of the bearing cartridge 140 used in the turbocharger assembly 100 facing along the longitudinal axis of the bearing cartridge 140. As shown in FIG. 5a, a bearing cartridge 140 includes an outer race 142, an inner race 144, and a cartridge opening 146. FIG. 5a shows a bearing cartridge 140 according to one embodiment of the present disclosure. FIG. 5b shows a cross-sectional view of the bearing cartridge 140 of FIG. 5a along section A-A. As shown in FIG. 2, the inner race 144 of the bearing cartridge 140 receives and supports the turbine shaft 160 and the outer race 142 is positioned around the inner race 144, so that inner race 144 has a smaller diameter than outer race 142. While the inner race and outer race can have diameters of any size so long as the inner race has a smaller diameter than the outer race, in this example the inner race has a diameter of about 0.4 inches and the outer race has a diameter of about 1.12 inches. The outer and inner races 142, 144 may be formed of various materials including, but not limited to, steel, tool steel, aluminum, and the like. Further, while the length of the hearing cartridge 140 can be any length, the length of the bearing cartridge 140 in this example is about 2.17 inches and the diameter of the cartridge opening 146 is about 0.32 inches.

As shown in FIG. 5b, the outer race 142 may include fluid passageways 192, which allows for oil or other fluids to pass from the space between the bearing housing 130 (shown in FIG. 2) and the bearing cartridge 140 (shown in FIG. 2) to the space between the inner and outer races 142,144. The fluid passageways 192 may be about 0.41 inches, 0.67 inches, or another distance from the longitudinal axis of the cartridge opening 146. The fluid passageways 192 may have a diameter of about 0.06 inches and angled at about sixty-nine degrees from the inner surface of the outer race 142, such that the top portion of the passageway 192 is closer to the cartridge opening 146 (as shown, for example, in FIG. 5b). Of course, various other dimensions may be used. As noted previously, the dimensions of the bearing cartridge 140 may depend upon the desired performance, size of the other components, and the like.

Generally, the bearing cartridge 140 is substantially centered on the longitudinal axis of the housing 130 and positioned within the housing 130 such that the cartridge opening 146 is substantially aligned with the housing opening 135. In this way, at least a portion of the pin 150 may be inserted through the housing opening 135 and through the cartridge opening 146. The outer race 142 is typically held fixed relative to the housing 130, while the inner race 144 is permitted to rotate.

FIGS. 5a and 5b show ball bearings 143 between the inner race 144 and outer race 142. The ball bearings 143 maintain a separation between the outer and inner races 142, 144. The ball bearings 143 within the bearing cartridge 140 can withstand loads transferred from the inner race 144 to the outer race 142 of the bearing cartridge 140. For example, as the shaft 160 (shown in FIG. 1) moves and rotates, it interacts with the inner race 144 causing the inner race 144 to rotate and move. The one or more ball bearings 143 in the bearing cartridge 140 transfer this movement and rotation to the outer race 142, which, in turn, compresses the fluid between the bearing cartridge 140 and housing 130. In response, the fluid resists the movement of the outer race 142. This resistance is transferred back to the shaft 160 via the ball bearings 143 and inner race 144. In this way, the shaft 160 experiences damping. Of course, it should be noted more than one ball bearing 143 may be included in the bearing cartridge 140, such as, for example, two, three, four, or eight ball bearings (see, for example, FIG. 5a). Of course, various other numbers of ball bearings 143 may be used. The number of ball bearings 143 used in a bearing cartridge 140 may typically be based upon the size of the bearings and the dimensions of the bearing cartridge 140. While any suitably sized bearing can be used, bearings of about 0.31 inches are used in this embodiment. The multiple ball bearings 143 may be equidistant from one another or evenly spaced between the inner and outer races 142,144. In order to maintain the desired spacing between ball bearings 143, the bearing cartridge 140 may optionally, include a cage 149 (shown in FIG. 5a), which is common in the art. The ball bearings 143 may be formed of various materials including, but not limited to, ceramics, silicon nitride, steel, and the like.

As mentioned above, the pin 150 may be inserted into the housing opening 135 and cartridge opening 146 such that the taper 387 of the body portion 380 of the pin 150 mates with the taper 138 of the housing opening 135, which may result in forming a seal between the pin 150 and housing opening 135. The cartridge opening 146 is generally configured to tightly receive the first protruding feature 385 of the pin 150 such that the pin 150 substantially restricts the axial and rotational movement of the bearing cartridge 140 but substantially permits all other movements of the bearing cartridge 140. The tight fit between the bearing cartridge 140 and the first protruding feature 385 of the pin 150 substantially limits the ability of the bearing cartridge 140 to surge or roll with respect to the housing 130 but does not substantially limit the ability of the bearing cartridge 140 to move or rotate in other manners, such as sway, pitch, or yaw.

The turbocharger assembly 100 may also include one or more o-rings. As shown in FIGS. 1 and 2, one or more o-rings 200 may be secured about the pin 150 and at least partially between the pin 150 and the housing 130. In this configuration, the o-rings 200 may at least provide a seal to substantially restrict the leaking of fluid (e.g., oil) out of the assembly 100 via the housing opening 135. In some cases, the use of o-rings 200 in the assembly 100 may be used in addition to the taper configuration of the pin 150 and housing 130 discussed above or as an alternative to the taper configuration. It should also be noted that a high temperature thread sealant may be used in addition to the one or more o-rings 200 to provide a secondary seal.

Figure 6:
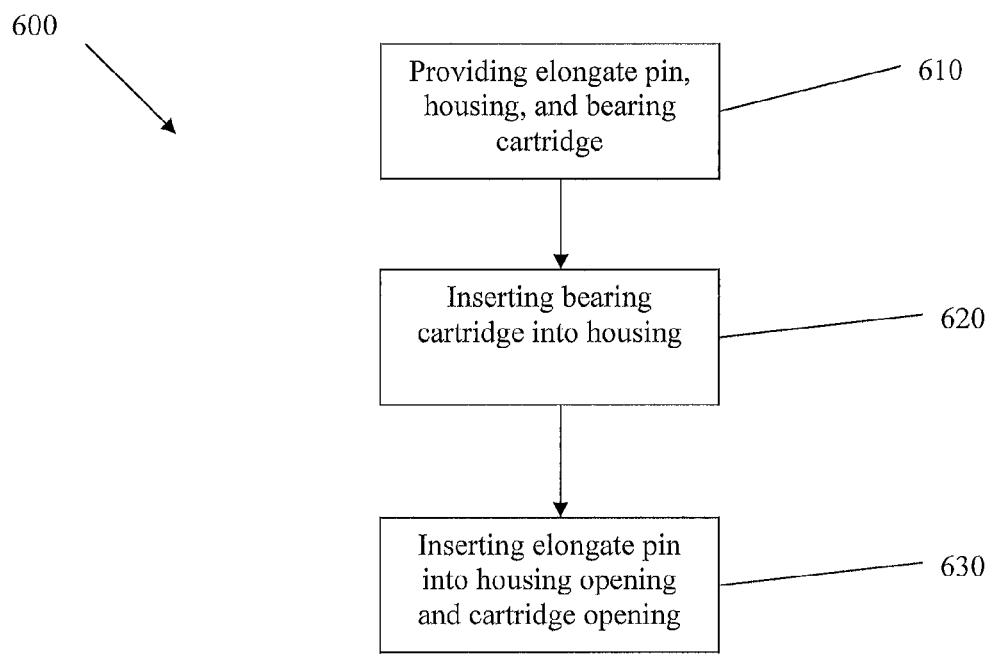
FIG. 6 shows a flow chart of a method of assembling a turbocharger according to one embodiment of the present disclosure.

A method of assembling a turbocharger 600 according to one embodiment of the present disclosure is shown in FIG. 6. As shown in FIG. 6, the method 600 includes the step 610 of providing the elongate pin 150, housing 130, and bearing cartridge 140. As described above, the elongate pin 150 may include a first protruding feature 385 and a taper 387 on at least a part of the body portion 380. The housing 130 may include a taper 138 and be configured to receive at least a portion of the elongate pin 150. The bearing cartridge 140 may include a cartridge opening 146 that is configured to receive and mate with the first protruding feature 385 of the pin 150. The method 600 also includes the step 620 of placing or inserting the bearing cartridge 140 within the housing 130. Typically, the bearing cartridge 140 is substantially centered on the longitudinal axis between the first bore end 132 and the second bore end 134 of the housing 130 such that the cartridge opening 146 is substantially aligned with the housing opening 135. The method 600 also includes the step 630 of inserting the elongate pin 150 into both the housing opening 135 and the cartridge opening 146 such that the taper 387 of the body portion 380 of the elongate pin 150 mates with the taper 138 of the housing opening 135. Also, the first protruding feature 385 fits within the cartridge opening 146 so that the pin 150 substantially restricts the bearing cartridge 140 from surging and rolling with respect to the housing 130 but substantially permits all other movements of the bearing cartridge 140.

While this disclosure has been described as having various embodiments, these embodiments according to the present disclosure can be further modified within the scope and spirit of this disclosure. This application is therefore intended to cover any variations, uses, or adaptations of the disclosure using its general principles. A practitioner may determine in a particular implementation that a plurality of components of the disclosed assembly may be combined in various ways, or that different components or different variations of the components may be employed to accomplish the same results. A practitioner may also determine in a particular implementation that a plurality of steps of the disclosed method of assembling a turbocharger may be combined in various ways, or that different steps or variations of the steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

The invention claimed is:

1. An assembly for a turbocharger, the assembly comprising:
   a housing comprising a substantially cylindrical bore having a longitudinal axis, a first bore end, a second bore end, and a housing opening between the two ends, wherein at least a part of the housing opening comprises a taper;
   a bearing cartridge comprising an outer race, an inner race, and a cartridge opening defined by a cartridge surface, wherein the bearing cartridge is positioned within said housing substantially centered on the longitudinal axis between the first bore end and the second bore end such that the cartridge opening is substantially aligned with the housing opening; and
   an elongate pin having a taper body portion and a first protruding feature, wherein the first protruding feature comprises a substantially spheroid shape;
   wherein the elongate pin is positioned within the housing opening and the first protruding feature of the elongate pin is at least partially disposed within the cartridge opening; such that, the taper of the body portion of the pin mates with the taper of the housing opening to maintain the pin in substantially the same position relative to the housing and the first protruding feature of the pin mates with the cartridge surface such that the first protruding feature substantially restricts the bearing cartridge from surging and rolling but substantially permits heaving, swaying, pitching, and yawing of the bearing cartridge.

2. The assembly of claim 1, wherein the housing opening is substantially perpendicular to the longitudinal axis.

3. The assembly of claim 1, wherein the taper of the body portion of the pin and the taper of the housing opening form a seal between the pin and the housing opening.

4. The assembly of claim 1, wherein the elongate pin further comprises a first end with a first opening, a body portion with a body opening, and a body channel that passes through the body portion and fluidly connects the first opening to the body opening.

5. The assembly of claim 4, wherein the elongate pin further comprises a second end opposite the first end so that the body portion and taper are positioned between the first and second end and wherein the body opening is located between the second end and the taper of the body portion of the pin.

6. The assembly of claim 1, wherein the taper of the pin comprises about a sixty degree taper.

7. An assembly for a turbocharger, the assembly comprising:
   a housing comprising a substantially cylindrical bore having a longitudinal axis, a first bore end, a second bore end, and a housing opening between the two ends;
   a bearing cartridge comprising an outer race, an inner race, and a cartridge opening defined by a cartridge surface, wherein the bearing cartridge is positioned within said housing substantially centered on the longitudinal axis between the first bore end and the second bore end such that the cartridge opening is substantially aligned with the housing opening; and
   an elongate pin having a first protruding feature, wherein the first protruding feature comprises a substantially spheroid shape;
   wherein the elongate pin is positioned within the housing opening and the first protruding feature of the elongate pin is at least partially disposed within the cartridge opening; such that, the first protruding feature of the pin mates with the cartridge surface such that the first protruding feature substantially restricts the bearing cartridge from surging and rolling but substantially permits heaving, swaying, pitching, and yawing of the bearing cartridge.

8. The assembly of claim 7, wherein the housing opening is substantially perpendicular to the longitudinal axis.

9. The assembly of claim 7, further comprising at least one o-ring located between the housing and the elongate pin.

10. The assembly of claim 7, wherein the elongate pin further comprises a first end with a first opening, a body portion with a body opening, and a body channel that passes through the body portion and fluidly connects the first opening to the body opening.

11. The assembly of claim 7, wherein the bearing cartridge and housing define a dampening space configured to hold a film of pressurized oil.

12. The assembly of claim 7, wherein the bearing cartridge includes at least four ball bearings.

13. A method of assembling a turbocharger, the method comprising:
   providing a housing comprising a substantially cylindrical bore having a longitudinal axis, a first bore end, a second bore end, and a housing opening between the two ends;
   providing a bearing cartridge comprising an outer race, an inner race, and a cartridge opening defined by a cartridge surface;
   providing an elongate pin having a first protruding feature, wherein the first protruding feature comprises a substantially spheroid shape;
   placing the bearing cartridge within the housing substantially centered on the longitudinal axis between the first bore end and the second bore end such that the cartridge opening is substantially aligned with the housing opening; and
   inserting the elongate pin into the housing opening and the cartridge opening such that the first protruding feature is at least partially disposed within the cartridge opening so that the first protruding feature substantially restricts the bearing cartridge from surging and rolling but substantially permits heaving swaying, pitching and yawing of the bearing cartridge.

14. The method of claim 13, wherein the housing opening is substantially perpendicular to the longitudinal axis.

15. The method of claim 13, wherein the elongate pin further comprises a first end with a first opening, a body portion with a body opening, and a body channel that passes through the body portion and fluidly connects the first opening to the body opening.

16. The method of claim 15, further comprising placing at least one o-ring between the housing and the elongate pin.

17. The method of claim 13, wherein the bearing cartridge and housing define a dampening space configured to hold a film of pressurized oil.

18. The method of claim 13, wherein the bearing cartridge includes at least four ball bearings.

\* \* \* \* \*